(12) United States Patent
Ko (10) Patent No.: US 10,503,302 B1
(45) Date of Patent: Dec. 10, 2019

(54) TOUCH SENSING APPARATUS (71) Applicant: Acer Incorporated, New Taipei (TW)

(72) Inventor: Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/100,217

(22) Filed: Aug. 10, 2018

(30) Foreign Application Priority Data

May 23, 2018 (TW) .............................. 107117586 A (51) Int. Cl.
*G06F 3/041* (2006.01)
*G06F 3/0354* (2013.01)
*G06F 3/044* (2006.01)

(52) U.S. Cl.
CPC ........ *G06F 3/0412* (2013.01); *G06F 3/03545* (2013.01); *G06F 3/044* (2013.01); *G06F 3/0416* (2013.01)

(58) Field of Classification Search
CPC .. G06F 3/0412; G06F 3/03545; G06F 3/0416; G06F 3/044
USPC ........................................................ 345/173
See application file for complete search history.

(56) References Cited

U.S. PATENT DOCUMENTS

| 7,812,827 | B2* | 10/2010 | Hotelling | G06F 3/0416 345/173 |
| 7,995,041 | B2* | 8/2011 | Chang | G06F 3/044 345/173 |
| 8,183,875 | B2* | 5/2012 | Cordeiro | G06F 3/0416 324/662 |
| 8,217,913 | B2* | 7/2012 | Hotelling | G06F 3/0412 345/173 |
| 8,416,209 | B2* | 4/2013 | Hotelling | G06F 3/0416 345/173 |
| 9,996,175 | B2* | 6/2018 | Hotelling | G06F 1/3218 |
| 10,001,888 | B2* | 6/2018 | Hong | G06F 3/0412 |
| 10,365,773 | B2* | 7/2019 | Yousefpor | G06F 3/044 |
| 2007/0216657 | A1* | 9/2007 | Konicek | G06F 3/0412 345/173 |
| 2014/0210748 | A1* | 7/2014 | Narita | G06F 3/0354 345/173 |
| 2014/0240280 | A1* | 8/2014 | Ekici | G06F 3/044 345/174 |

\* cited by examiner

*Primary Examiner* — Fred Tzeng
(74) *Attorney, Agent, or Firm* — JCIPRNET (57) ABSTRACT A touch sensing apparatus configured to receive an input signal of a stylus pen is provided. The touch sensing apparatus includes a display panel, a touch panel and a control circuit. The touch panel includes a substrate, a touch sensing element and a decorative element. The touch sensing element has a plurality of nodes for detecting the input signal. The control circuit is coupled to the display panel and the touch panel to activate a plurality of functions of the touch sensing apparatus through a plurality of determination steps, e.g., whether a capacitive sensing value of the node falls in a first threshold range, larger than a second threshold or larger than a third threshold, and whether the stylus pen touches the touch panel.

6 Claims, 7 Drawing Sheets

FIG. 7

# TOUCH SENSING APPARATUS

CROSS-REFERENCE TO RELATED APPLICATION

This application claims the priority benefit of Taiwan application serial no. 107117586, filed on May 23, 2018. The entirety of the above-mentioned patent application is hereby incorporated by reference herein and made a part of this specification.

BACKGROUND

Technical Field

The disclosure relates to an electronic apparatus, and particularly relates to a touch sensing apparatus.

Description of Related Art

With the advancement of the touch sensing technology, touch screens are used in more and more electronic apparatuses as input and output interfaces. The touch panels may receive input signals from fingers as well as stylus pens. The stylus pens nowadays only interactive with the active area or the viewable area of the touch panel, and thus more innovative interactions are desired.

SUMMARY

The disclosure provides a touch sensing apparatus that further provides the stylus pen with a touch sensing function in the peripheral area.

A touch sensing apparatus in this disclosure is configured to receive an input signal of a stylus pen. The touch sensing apparatus includes a display panel, a touch panel and a control circuit. The touch panel is bonded to the display panel, and the touch panel includes a substrate, a touch sensing element and a decorative element. The touch sensing element is located on the substrate and includes a plurality of nodes for detecting the input signal of the stylus pen. The plurality of nodes are disposed in an active area of the substrate and are not disposed in a peripheral area of the substrate. The decorative element covers at least a portion of the peripheral area and exposes at least a portion of the active area. The control circuit is coupled to the display panel and the touch panel. When the control circuit receives a tip-on signal representing that the stylus pen touches the touch sensing apparatus, and a first capacitive sensing value of a first node at an edge of the active area falls in a first threshold range, the control circuit determines that the input signal of the stylus pen is a peripheral area input signal, and sets the display panel to display a first graph corresponding to the peripheral area input signal. When the control circuit receives the tip-on signal representing that the stylus pen touches the touch sensing apparatus, and a second capacitive sensing value of the first node at the edge of the active area is larger than a second threshold that is larger than or equal to a maximum value of the first threshold range, the control circuit determines that the input signal of the stylus pen is an active area input signal, and sets the display panel to display a second graph corresponding to the active area input signal. When the control circuit does not receive the tip-on signal representing that the stylus pen touches the touch sensing apparatus, and a third capacitive sensing value of the node at the edge of the active area is larger than a third threshold, the control circuit determines that the input signal of the stylus pen is a hover input signal, and sets the display panel to display a third graph corresponding to the hover input signal.

In an embodiment of the disclosure, the decorative element further includes a non-conductive indicating icon located in the peripheral area, and the non-conductive indicating icon is adjacent to the first node at the edge of the active area.

In an embodiment of the disclosure, the non-conductive indicating icon is adjacent to a plurality of second nodes disposed at the edge of the active area and representing a line-shaped operation. When the control circuit receives the tip-on signal representing that the stylus pen touches the touch sensing apparatus, a plurality of fourth capacitive sensing values of the plurality of second nodes at the edge of the active area fall in the first threshold range, and at least one of the fourth capacitive sensing values changes, the control circuit sets the display panel to display a fourth graph corresponding to the line-shaped operation.

In an embodiment of the disclosure, the indicating icon is adjacent to a plurality of third nodes disposed at the edge of the active area and representing a dot-shaped operation. When the control circuit receives the tip-on signal representing that the stylus pen touches the touch sensing apparatus, a plurality of fifth capacitive sensing values of the plurality of third nodes at the edge of the active area fall in the first threshold range, and none of the fifth capacitive sensing values changes, the control circuit sets the display panel to display a fifth graph corresponding to the dot-shaped operation.

In an embodiment of the disclosure, the control circuit receives a plurality of sixth capacitive sensing values of all of the plurality of nodes in the touch sensing element, and the control circuit selects a seventh capacitive sensing value of the first node at the edge of the active area from the sixth capacitive sensing values to determine whether the input signal of the stylus pen is the peripheral area input signal, the active area input signal, or the hover input signal.

In an embodiment of the disclosure, the control circuit receives an eighth capacitive sensing value of the first node at the edge of the active area before or after receiving a plurality of ninth capacitive sensing values of all of the plurality of nodes in the touch sensing element to determine whether the input signal of the stylus pen is the peripheral area input signal, the active area input signal, or the hover input signal.

Based on the foregoing, in the touch sensing apparatus of the embodiments of this disclosure, the at least one node disposed at the edge of the active area is further used for touch sensing in the peripheral area in addition to the touch sensing function in the active area. Therefore, the touch sensing apparatus of the embodiments of the disclosure may provide the stylus pen with the touch sensing function in the active area as well as in the peripheral area.

To make the aforementioned and other features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
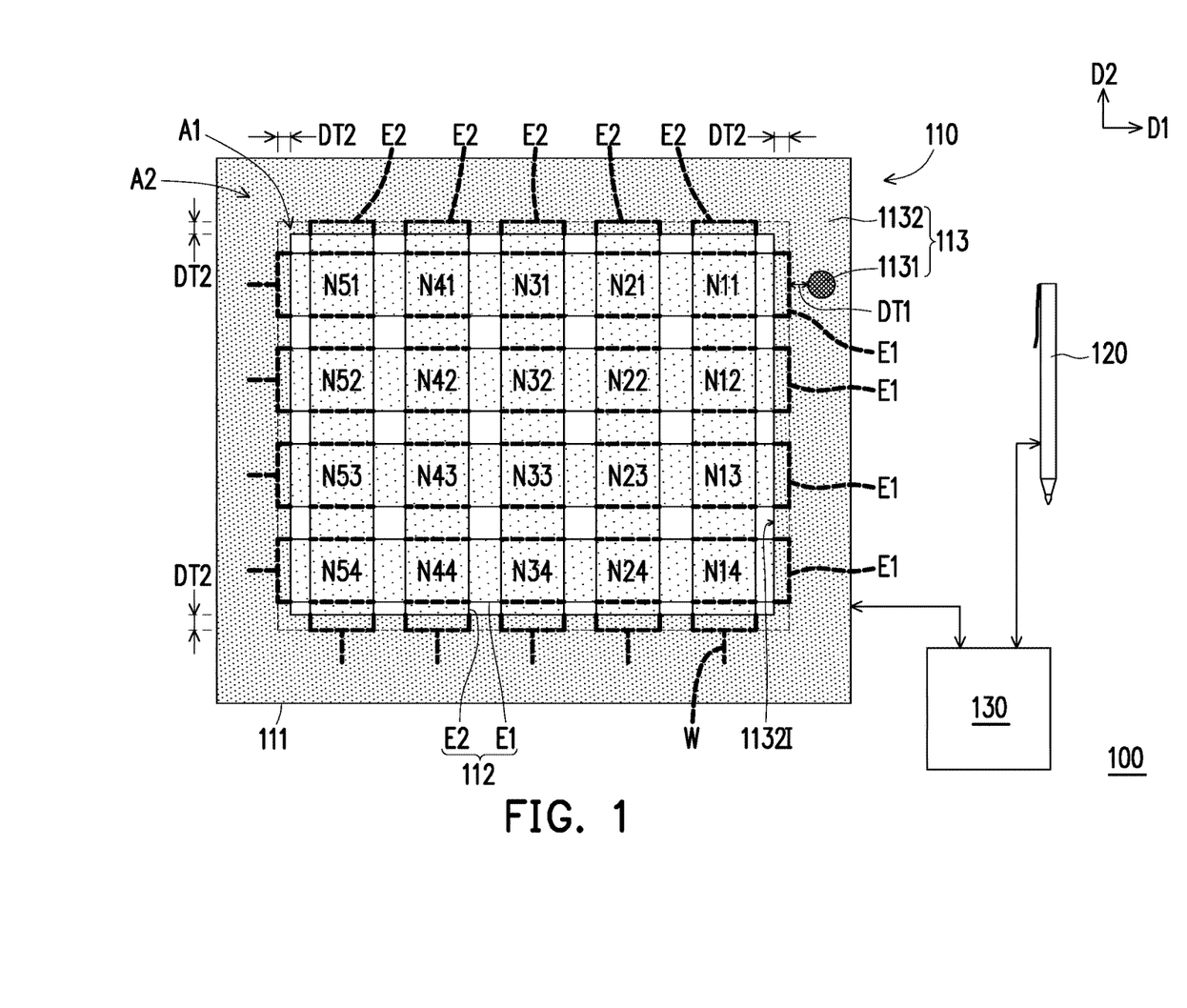
FIG. 1 and FIG. 2 are respectively a schematic top view and a schematic cross-sectional view of a touch sensing apparatus according to a first embodiment of the disclosure.
Figure 2:
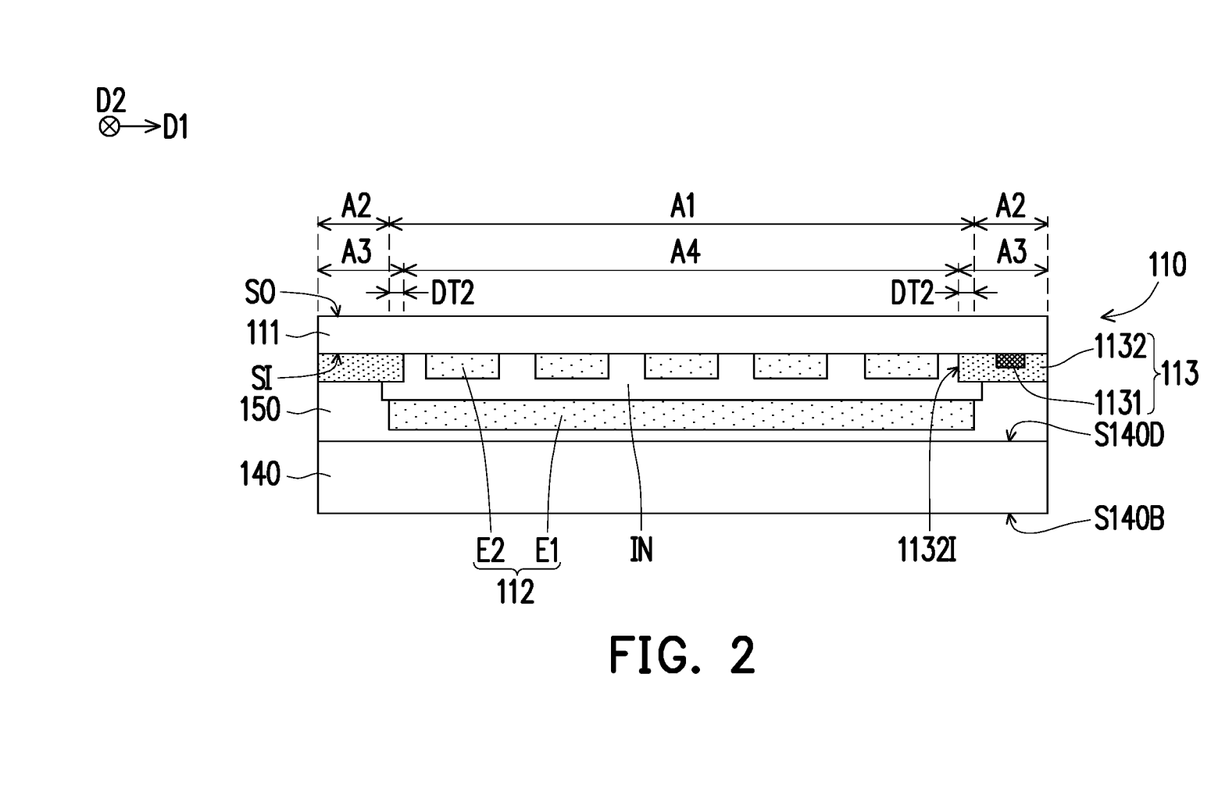

FIG. 1 and FIG. 2 are respectively a schematic top view and a schematic cross-sectional view of a touch sensing apparatus according to a first embodiment of the disclosure. With reference to FIG. 1 and FIG. 2, a touch sensing apparatus 100 in the first embodiment of the disclosure includes a touch panel 110, a stylus pen 120 and a control circuit 130.

The touch panel 110 includes a substrate 111, a touch sensing element 112 and a decorative element 113. The substrate 111 is adapted to carry the touch sensing element 112. For example, the substrate 111 may be implemented using a hard sheet or a flexible thin film. The material of the substrate 111 may be glass or plastic, but is not limited thereto. In one embodiment, the substrate 111 may be a composite substrate. The composite substrate may be formed by stacking a plurality of layers of glass, by stacking a plurality of layers of plastic, or by stacking at least one layer of glass and at least one layer of plastic.

In this embodiment, the substrate 111, besides serving as a carrying plate for the touch sensing element 112, also serves as a cover plate for protecting the touch sensing element 112. The touch sensing element 112 is located on an inner surface SI of the substrate 111, and an outer surface SO of the cover plate serves as a touch operation surface. In other words, a user's finger or the stylus pen 120 performs a two-dimensional (X-Y coordinate system) touch operation or a hover touch operation on the outer surface SO of the cover plate. The substrate 111 may be a full flat cover plate (as shown in FIG. 2), a partial flat cover plate that is flat in the middle and curved at the edges (also known as 2.5D cover plate), or a curved cover plate (also known as a 3D cover plate). In one embodiment, the substrate 111 may simply serve as a carrying plate for the touch sensing element 112, and the touch panel 110 may further include a cover plate disposed on the touch sensing element 112 to protect the touch sensing element 112 and to serve as a touch operation surface.

The touch sensing element 112 includes a plurality of nodes for detecting a touch input signal (such as nodes N11, N12, N13, N14, N21, N22, N23, N24, N31, N32, N33, N34, N41, N42, N43, N44, N51, N52, N53 and N54 as shown in FIG. 1). The plurality of nodes are disposed in an active area A1 of the substrate 111 and are not disposed in a peripheral area A2 of the substrate 111.

In detail, the touch sensing element 112 includes a plurality of electrodes (such as a plurality of electrodes E1 and a plurality of electrodes E2 as shown in FIG. 1). The plurality of electrodes define locations of the plurality of nodes, and the nodes are disposed in the active area A1 (such as the area inside the frame illustrated by thin dashed lines in FIG. 1, wherein the frame is for illustrative purposes only and is not a real structure or component) but are not disposed in the peripheral area A2 (such as the area outside the frame in FIG. 1).

The plurality of electrodes may adopt a double-layer touch sensing structure or a single-layer touch sensing structure. FIG. 1 and FIG. 2 schematically show one of the embodiments of the double-layer touch sensing structure. However, the touch sensing element in this disclosure may adopt any form of touch sensing structure without being limited to the disclosure of the drawings.

In the double-layer touch sensing structure, the plurality of electrodes E1 and the plurality of electrodes E2 are arranged in an interlacing manner to define the locations of the plurality of nodes. Specifically, the plurality of nodes are respectively located at intersections between the plurality of electrodes E1 and the plurality of electrodes E2. Besides, the touch panel 110 further includes an insulating layer IN disposed between the plurality of electrodes E1 and the plurality of electrodes E2 (not shown in FIG. 1; please refer to FIG. 2), so that the plurality of electrodes E1 and the plurality of electrodes E2 are electrically insulated from one another.

In this embodiment, the plurality of electrodes E1 and the plurality of electrodes E2 are each a stripe electrode. The plurality of electrodes E1 are disposed on the inner surface SI of the substrate 111 and each extend in a first direction D1. The insulating layer IN is disposed on the plurality of electrodes E1 and on the inner surface SI exposed by the plurality of electrodes E1. The plurality of electrodes E2 are disposed on the insulating layer IN and respectively extend in a second direction D2. Besides, the first direction D1 and the second direction D2 are perpendicular to each other. However, the number, pattern and extending direction of each component, the relative configuration relationship between the plurality of components and the sequence thereof in the touch panel 110 may be adjusted as required, and are not limited to the disclosure of FIG. 1 and FIG. 2. For example, the locations of the plurality of electrodes E1 and the locations of the plurality of electrodes E2 in FIG. 2 may be reversed. Besides, the included angle between the first direction D1 and the second direction D2 may be greater than 0 degrees and less than 90 degrees.

In addition, in the configuration where the touch panel 110 further includes a cover plate, the plurality of electrodes E2 (or the plurality of electrodes E1), the insulating layer IN and the plurality of electrodes E1 (or the plurality of electrodes E2) may be sequentially formed on the substrate 111 first. Then, the cover plate is attached onto the plurality of electrodes E1 (or the plurality of electrodes E2) through an adhesive layer. In one embodiment, the plurality of electrodes E1 and the plurality of electrodes E2 may be respectively disposed on two opposite surfaces of the substrate 111 to omit the configuration of the insulating layer IN, and the cover plate may then be attached onto the plurality of electrodes E1 (or the plurality of electrodes E2) through an adhesive layer. In another embodiment, the plurality of electrodes E1 and the plurality of electrodes E2 may be respectively disposed on the substrate 111 and the cover plate, and the plurality of electrodes E1 and the plurality of electrodes E2 are then attached to one another through a non-conductive adhesive layer. In yet another embodiment, the plurality of electrodes E1 and the plurality of electrodes E2 may be respectively disposed on the substrate 111 and another substrate (such as a hard sheet or a flexible thin film), and the plurality of electrodes E1 and the plurality of electrodes E2 are then attached to one another through an adhesive layer, and the substrate 111 (or another substrate) is attached to the cover plate.

Figure 3:
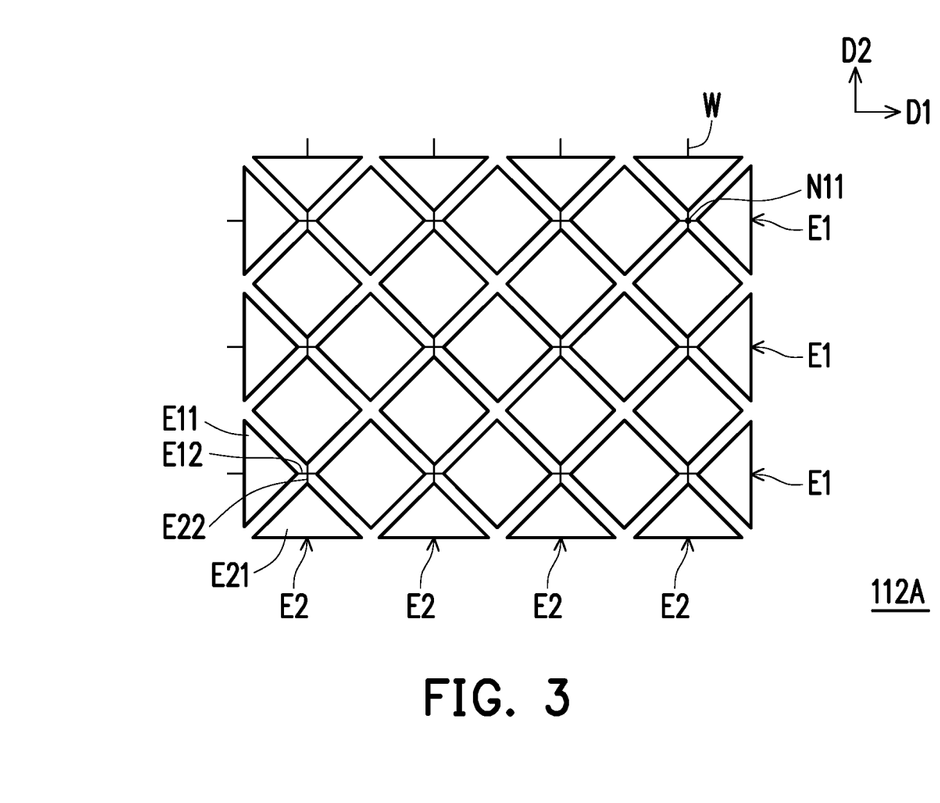
FIG. 3 and FIG. 4 are schematic top views respectively showing two other embodiments of the touch sensing element of the touch sensing apparatus in this disclosure.
Figure 4:
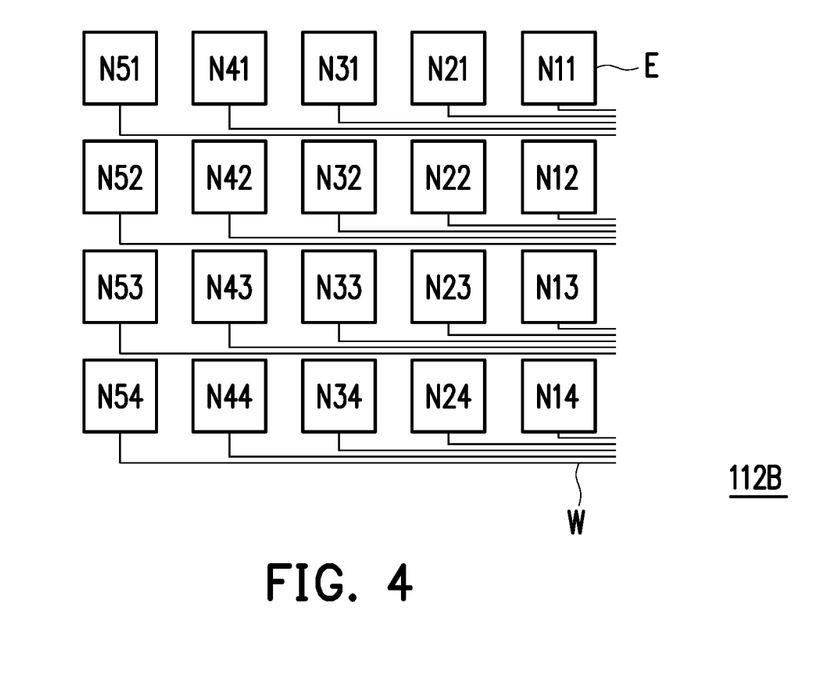

FIG. 3 and FIG. 4 are schematic top views respectively showing two other embodiments of the touch sensing element of the touch sensing apparatus in this disclosure. FIG. 3 schematically shows another embodiment of the double-layer touch sensing structure, and FIG. 4 schematically shows one of the embodiments of the single-layer touch sensing structure.

With reference to a touch sensing element 112A in FIG. 3, each electrode E1 includes a plurality of pad portions E11 and a plurality of connecting portions E12. Each connecting portion E12 connects two adjacent pad portions E11 in the first direction D1. Besides, each electrode E2 includes a plurality of pad portions E21 and a plurality of connecting portions E22. Each connecting portion E22 connects two adjacent pad portions E21 in the second direction D2. The plurality of connecting portions E12 of each electrode E1 and the plurality of connecting portions E22 of each electrode E2 are arranged in an interlacing manner to define the locations of the plurality of nodes (FIG. 3 only schematically shows the node N11). Specifically, the plurality of nodes are respectively located at intersections between the plurality of connecting portions E12 and the plurality of connecting portions E22. The configuration/forming method of the double-layer touch sensing structure in FIG. 3 may be any known configuration/forming method, and detailed description thereof is not repeated hereinafter.

With reference to a touch sensing element 112B in FIG. 4, in the single-layer touch sensing structure, a plurality of electrodes E may be arranged in an array, and the locations of the plurality of electrodes E are the locations of the plurality of nodes. In the configuration of the single-layer touch sensing structure, the insulating layer IN of FIG. 2 may be omitted. Other known implementation forms of the single-layer touch sensing structure also fall within the scope of this disclosure.

Whether configured as the double-layer touch sensing structure or as the single-layer touch sensing structure, the touch sensing element 120 may further include a plurality of conductive wires W, and each electrode may be electrically connected to at least one conductive wire W for signal transmission.

With reference to FIG. 1 and FIG. 2 again, the decorative element 113 covers at least a portion of the peripheral area A2 and exposes at least a portion of the active area A1. In this embodiment, to allow the user to recognize an operating area of the peripheral area A2 more easily, the decorative element 113 further includes at least one indicating icon 1131 correspondingly disposed in the operating area of the peripheral area A2. FIG. 1 schematically shows only one indicating icon 1131. However, the number of the indicating icon 1131 is not limited thereto. In another embodiment, the entire peripheral area A2 may also be set as the operating area without any indicating icon additionally provided in the peripheral area A2.

The indicating icon 1131 is located in the peripheral area A2. Besides, the indicating icon 1131 is non-conductive. Specifically, the indicating icon 1131 only serves to indicate the operating area of the peripheral area A2. Therefore, the indicating icon 1131 is non-conductive so as to avoid affecting a capacitive sensing value. For example, the material of the indicating icon 1131 may include resin, a plastic molecular compound, a non-conductive vacuum metallization (NCVM) coating or ink, but is not limited thereto.

Besides, the indicating icon 1131 is adjacent to at least one node (such as the node N11) disposed at the edge of the active area A1 so that the touch sensing state of the peripheral area A2 is determined by determining the capacitive sensing value of the at least one node. In this way, by means of the at least one node, the stylus pen may be provided with a touch sensing function in the peripheral area A2, and it is not necessary to additionally provide any nodes for touch sensing below the indicating icon 1131.

An orthographic projection of the indicating icon 1131 on the substrate 111 (i.e., where the indicating icon 1131 is located in FIG. 1) is separated from the active area A1 by a distance DT1. The greater the distance DT1, the greater the difference between the capacitive sensing value when the stylus pen 120 operates in the active area A1 and the capacitive sensing value when the stylus pen 120 operates in the peripheral area A2, and the easier it is to distinguish whether the input of the stylus pen 120 is made in the active area A1 or in the peripheral area A2 based on the capacitive sensing value. However, if the distance DT1 is too large, the capacitive sensing value corresponding to the input located in the peripheral area A2 is then too low to be discernible. In this embodiment, the distance DT1 is in a range of 2 mm to 10 mm. However, the distance DT1 may be changed according to actual design requirements (conditions such as the size of the electrode, the capacitive sensing value and so on).

In this embodiment, the decorative element 113 further includes a decorative pattern 1132. The decorative pattern 1132 covers at least a portion of the peripheral area A2 and exposes at least a portion of the active area A1. In detail, the decorative pattern 1132 may be used to hide traces or other components that are not intended to be seen in the touch sensing element 120, e.g., the plurality of conductive wires W in the touch sensing element 120. Besides, an inner edge 11321 of the decorative pattern 1132 may be located in the active area A1, such that a covering area A3 of the decorative pattern 1132 covers a portion of each electrode adjacent to the active area A1. For example, a distance DT2 between the inner edge 11321 of the decorative pattern 1132 and the edge of the active area A1 may fall in a range of 1 mm to 2 mm, but is not limited thereto. In one embodiment, the inner edge 11321 of the decorative pattern 1132 may be aligned with the edge of the active area A1, such as aligned with the frame illustrated by thin dashed lines in FIG. 1.

To effectively achieve the indicating effect, the indicating icon 1131 is made to be visually distinguishable from the decorative pattern 1132. For example, the indicating icon 1131 and the decorative pattern 1132 may have different colors or be made of different materials. The indicating icon 1131 and the decorative pattern 1132 may be formed on the cover plate (the substrate 111) by means of printing or attaching. In FIG. 2, the decorative pattern 1132 is formed on the inner surface S1 of the cover plate after the indicating icon 1131 is formed, and the decorative pattern 1132 covers the indicating icon 1131. However, the relative configuration relationship of the indicating icon 1131, the decorative pattern 1132 and the cover plate is not limited to the disclosure of FIG. 2. In one embodiment, the indicating icon 1131 and the decorative pattern 1132 may be respectively formed on the outer surface SO and the inner surface SI of the cover plate.

In another embodiment, the decorative pattern 1132 and the indicating icon 1131 may be sequentially formed on the outer surface SO of the cover plate. In yet another embodiment, the indicating icon 1131 may be an opening formed in the decorative pattern 1132. Alternatively, an opening may be formed at the location where the indicating icon 1131 is to be formed in the decorative pattern 1132 first, and the indicating icon 1131 is then formed in the opening, and herein the size of the opening may be the same or slightly larger than the size of the indicating icon 1131.

The touch sensing apparatus 100 may further include other components according to different requirements. For example, the touch sensing apparatus 100 may further include a display panel 140 to provide a display function. In other words, the touch sensing apparatus 100 may be an electronic apparatus (e.g., a mobile phone, a tablet computer or a laptop computer, but the disclosure is not limited thereto) having both the touch sensing function and the display function.

The display panel 140 may be any known display panel, e.g., a liquid crystal display panel or an organic electro-luminescence display panel, but is not limited thereto. The display panel 140 is configured to be overlapped with the touch sensing element 112, and the decorative pattern 1132 exposes a viewable area A4 (an area for displaying the image) of the display panel 140. For example, the touch sensing element 112 may be located on a display surface S140D of the display panel 140. In this configuration, for the purpose of preventing the plurality of electrodes (such as the plurality of electrodes E1 and the plurality of electrodes E2) from shielding light beams (not shown) from the display panel 140, the plurality of electrodes may be light-transmissive electrodes. The light-transmissive electrodes include electrodes made of a light-transmissive material or grid-like metal electrodes. In one embodiment, the touch sensing element 112 may also be located on a back surface S140B of the display panel 140. In this way, the plurality of electrodes need not be light-transmissive electrodes. In another embodiment, the display panel 140 and the touch panel 110 may also be integrated into a touch sensing display panel.

Besides, the touch sensing apparatus 100 may further include an adhesive layer 150 to bond the touch panel 110 and the display panel 140. In the configuration where the touch sensing element 112 is located on the display surface S140D of the display panel 140, the adhesive layer 150 is also configured to be light-transmissive. For example, the adhesive layer 150 may be formed by curing an optically clear adhesive (OCA), but the material of the adhesive layer 150 and the forming method thereof are not limited thereto.

The stylus pen 120 may be an active or a passive stylus pen to generate a corresponding touch input signal on the touch panel 110. The control circuit 130 is coupled to the touch panel 110, the stylus pen 120 and the display panel 140 to transceive signals with the touch panel 110, the stylus pen 120 and the display panel 140 or to set the operation states thereof. For example, the control circuit 130 may include components such as a central processing unit (CPU) and a communication circuit, but is not limited thereto.

Figure 5:
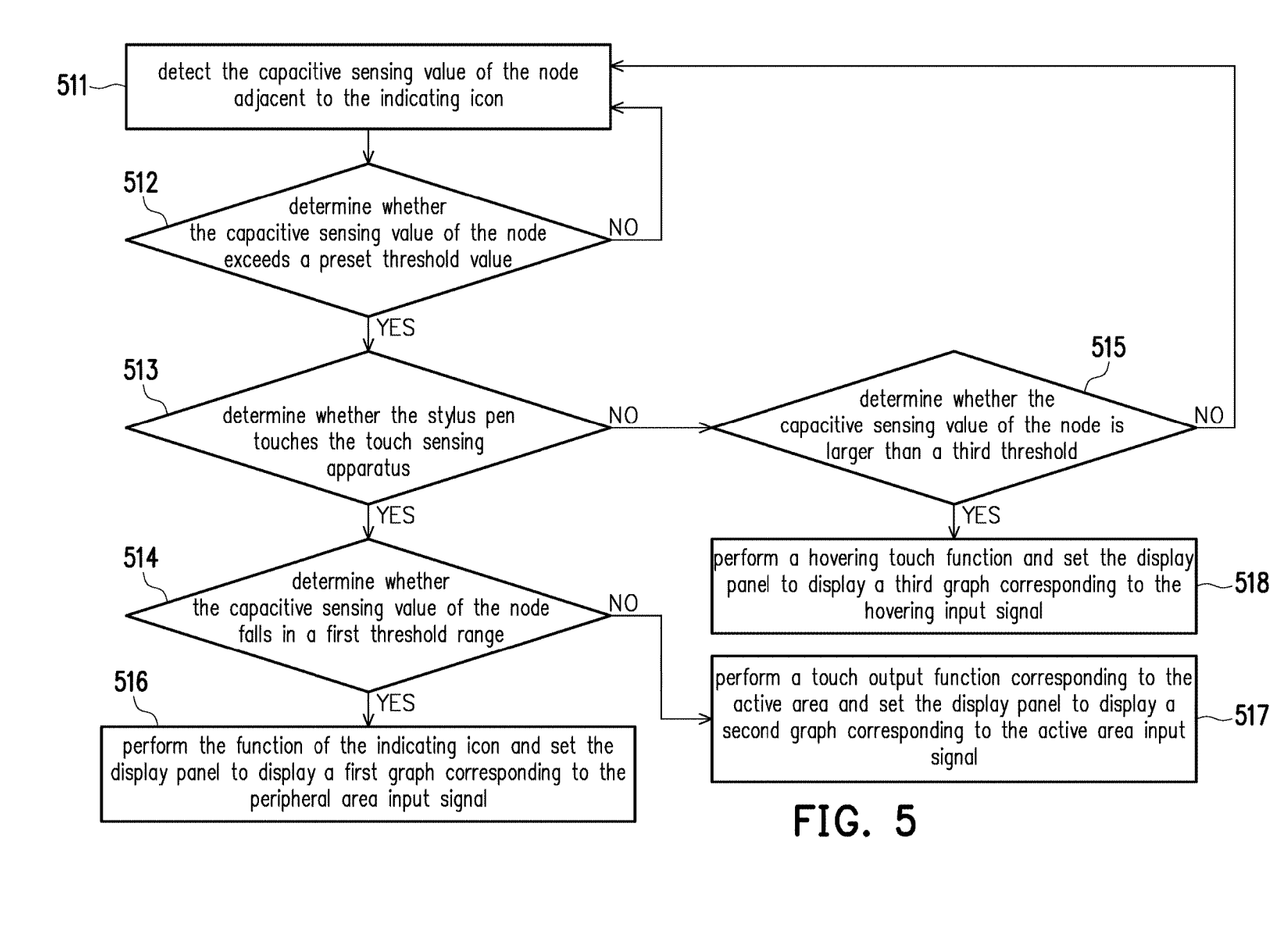
FIG. 5 is a determination flowchart of the touch sensing apparatus according to the first embodiment of the disclosure.

FIG. 5 is a determination flowchart of the touch sensing apparatus according to the first embodiment of the disclosure, showing the steps executed by the control circuit (such as the control circuit 130 of FIG. 1). In this embodiment, the steps executed by the control circuit as shown in FIG. 5 are explicated in light of the configuration where the touch sensing apparatus includes only one indicating icon, and the only one indicating icon is adjacent to one node (as shown in FIG. 1). In other embodiments, the touch sensing apparatus may also not include any indicating icon, and the control circuit may determine the input signal of the touch sensing apparatus by use of more nodes.

With reference to FIG. 1 and FIG. 5, in step 511, the capacitive sensing value of the node N11 adjacent to the indicating icon 1131 is detected. For example, capacitive sensing values of all the nodes in FIG. 1 may be simultaneously detected so as to determine the touch sensing states of the active area A1 and the peripheral area A2 at the same time. In this way, the control circuit 130 receives the capacitive sensing values of all the nodes in the touch sensing element 112, and then selects a capacitive sensing value of the node N11 at the edge of the active area A1 from the received capacitive sensing values to perform subsequent determination. Alternatively, the capacitive sensing value of the node N11 adjacent to the indicating icon 1131 may be separately detected after or before the capacitive sensing values of all the nodes are detected. That is, the touch sensing states of the active area A1 and the peripheral area A2 may be determined at separate times. In this way, the control circuit 130 receives the capacitive sensing value of the node N11 at the edge of the active area A1 before or after receiving the capacitive sensing values of all the nodes in the touch sensing element 112, and performs the subsequent determination according to the capacitive sensing value of the node N11 at the edge of the active area A1.

In step 512, it is determined whether the capacitive sensing value of the node N11 exceeds a preset threshold value. If the capacitive sensing value of the node N11 exceeds the threshold value, it means either that the stylus pen 120 touches the touch sensing apparatus 100, or that the stylus pen 120 is close to but does not touch the touch sensing apparatus 100. If the capacitive sensing value of the node N11 does not exceed the threshold value, it means that the stylus pen 120 is not in the touch operation range of the touch sensing apparatus 100, so the determination process returns to the step of detecting the capacitive sensing value of the node N11 (i.e., returning to step 511).

When the control circuit 130 determines that the capacitive sensing value of the node N11 exceeds the threshold value, it proceeds to determine whether the stylus pen 120 touches the touch sensing apparatus 100 (step 513). For example, the tip of the stylus pen 120 may be provided with a pressure sensing circuit. When the tip of the stylus pen 120 touches the touch sensing apparatus 100, the stylus pen 120 transmits a tip-on signal to the control circuit 130, so that the control circuit 130 may determine that the stylus pen 120 touches the touch sensing apparatus 100.

When the stylus pen 120 touches the touch sensing apparatus 100, the stylus pen 120 may touch the active area A1, or may touch the indicating icon 1131 of the peripheral area A2. Therefore, if the control circuit 130 determines that the stylus pen 120 touches the touch sensing apparatus 100, it proceeds to determine whether the capacitive sensing value of the node N11 falls in a first threshold range (step 514), and the minimum value of the first threshold range is set to be larger than the threshold value. If the capacitive sensing value of the node N11 falls in the first threshold range, it means that the stylus pen 120 touches the indicating icon 1131 of the peripheral area A2. Therefore, if it is determined that the capacitive sensing value of the node N11 falls in the first threshold range, the control circuit 130 determines that the input signal of the stylus pen 120 is an input signal corresponding to the peripheral area A2 (i.e., a peripheral area input signal). The control circuit 130 sets the display panel 140 to display a first graph corresponding to the peripheral area input signal (i.e., corresponding to the indicating icon operation) (step 516). For example, the display panel 140 is set to display a menu, a color palette or the like in the corresponding display area. On the other hand, when the capacitive sensing value of the node N11 is larger than a second threshold, and the second threshold is larger than or equal to the maximum value of the first threshold range, it means that the stylus pen 120 touches the active area A1. Therefore, the control circuit 130 determines that the input signal of the stylus pen 120 is an input signal corresponding to the active area A1 (i.e., an active area input signal). The control circuit 130 performs a touch output operation corresponding to the active area A1 and sets the display panel 140 to display a second graph corresponding to the active area input signal (step 517). For example, the display panel 140 is set to display an effect of performing a click operation in the corresponding display area or perform an ink output operation in a drawing program. When the ink output operation is performed, the color of the location in the viewable area A4 (see FIG. 2) corresponding to the stylus pen 120 is changed accordingly.

When the control circuit 130 does not receive the tip-on signal, it means that the stylus pen 120 does not touch the touch sensing apparatus 100, and the stylus pen 120 may be in a hover touch range of the touch sensing apparatus 100 or may be outside the hover touch range of the touch sensing apparatus 100. Therefore, in step 515, the control circuit 130 determines whether the capacitive sensing value of the node N11 is larger than a third threshold. If the capacitive sensing value of the node N11 is larger than the third threshold, it means that the stylus pen 120 is in the hover touch range of the touch sensing apparatus 100. Therefore, if it is determined that the capacitive sensing value of the node N11 is larger than the third threshold, the control circuit 130 determines that the input signal of the stylus pen 120 is a hover input signal, and the control circuit 130 performs a hover touch function to set the display panel 140 to display a third graph corresponding to the hover input signal (step 518). For example, the display panel 140 is set to display an effect of moving a cursor in the corresponding display area. On the contrary, if the capacitive sensing value of the node N11 is not larger than the third threshold, it means that the stylus pen 120 is outside the hover touch range of the touch sensing apparatus 100. Therefore, if it is determined that the capacitive sensing value of the node N11 is not larger than the third threshold, the determination process then returns to the step of detecting the capacitive sensing value of the node N11 (i.e., returning to step 511).

In one embodiment, the indicating icon 1131 is in the shape of a dot having a diameter of about 5 mm. Besides, the minimum value of the first threshold range is set to be larger than the threshold value, and the third threshold is set to be larger than the threshold value and may be smaller or larger than the minimum value of the first threshold range. In one embodiment, the operations corresponding to the indicating icon 1131 may include opening/closing the window, the previous step, the next step, advanced function setting or the like. Different operations may be output as the stylus pen 120 is pressed for a different period of time (such as a short press or a long press) or for a different number of times (such as a single-click or a double-click). The stylus pen 120 itself may also have a variety of input elements such as a pen-pressing element, a tilt element, or a button element. By means of predefinition, different input elements may have different functions under different touch sensing conditions. It should be noted that the shape, size and functions of the indicating icon 1131, the number of nodes corresponding to the indicating icon 1131 and the locations of the nodes, and the value or range of each threshold may be changed according to design requirements, and are not limited to the foregoing description. For example, the indicating icon 1131 may also be in the shape of a line or in the shape of a combination of a dot and a line. Besides, as the location or size of the indicating icon 1131 is changed, the number of nodes corresponding to the indicating icon 1131 may be greater than one.

Figure 6:
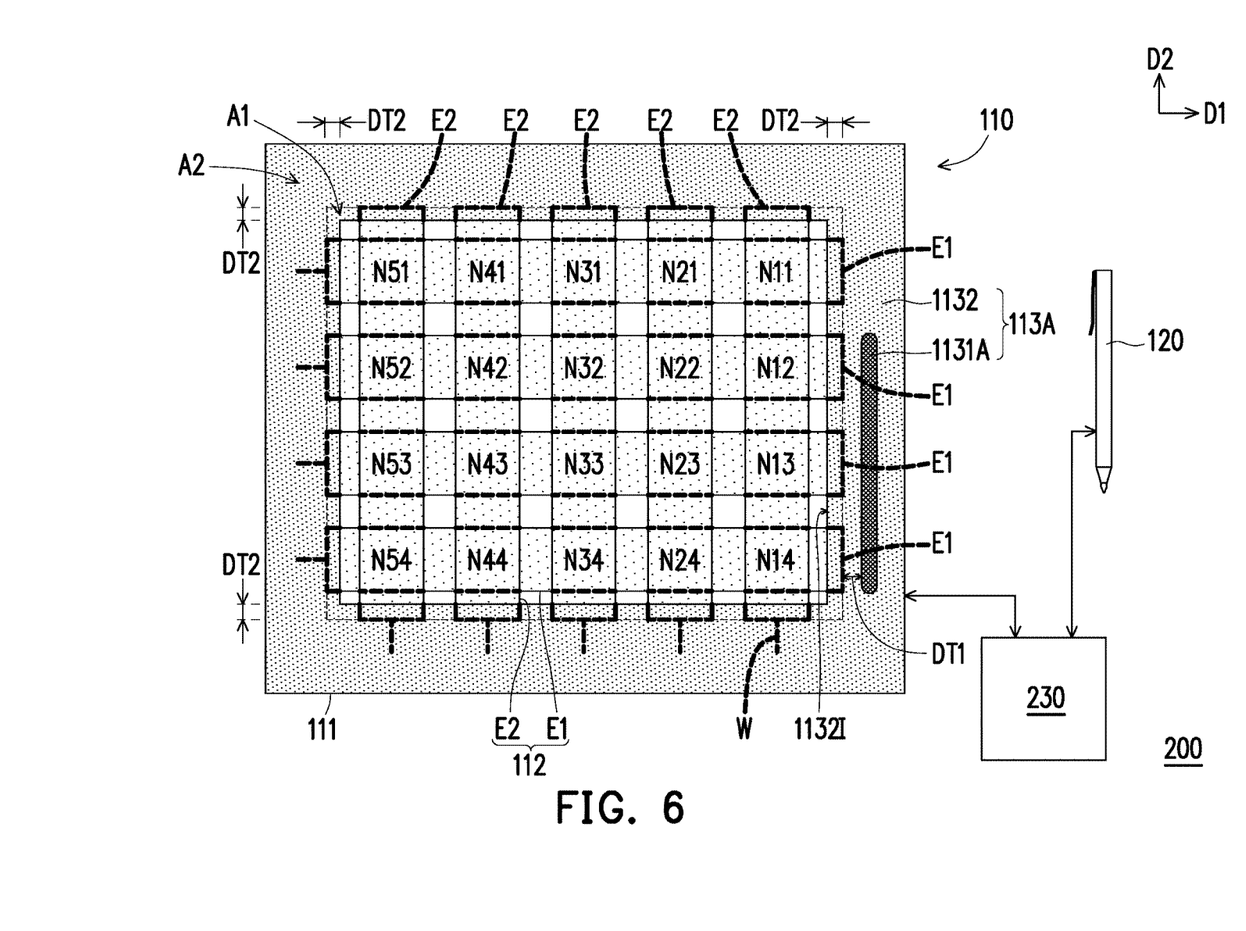
FIG. 6 and FIG. 7 are respectively a schematic top view and a determination flowchart of a touch sensing apparatus according to a second embodiment of the disclosure.
Figure 7:
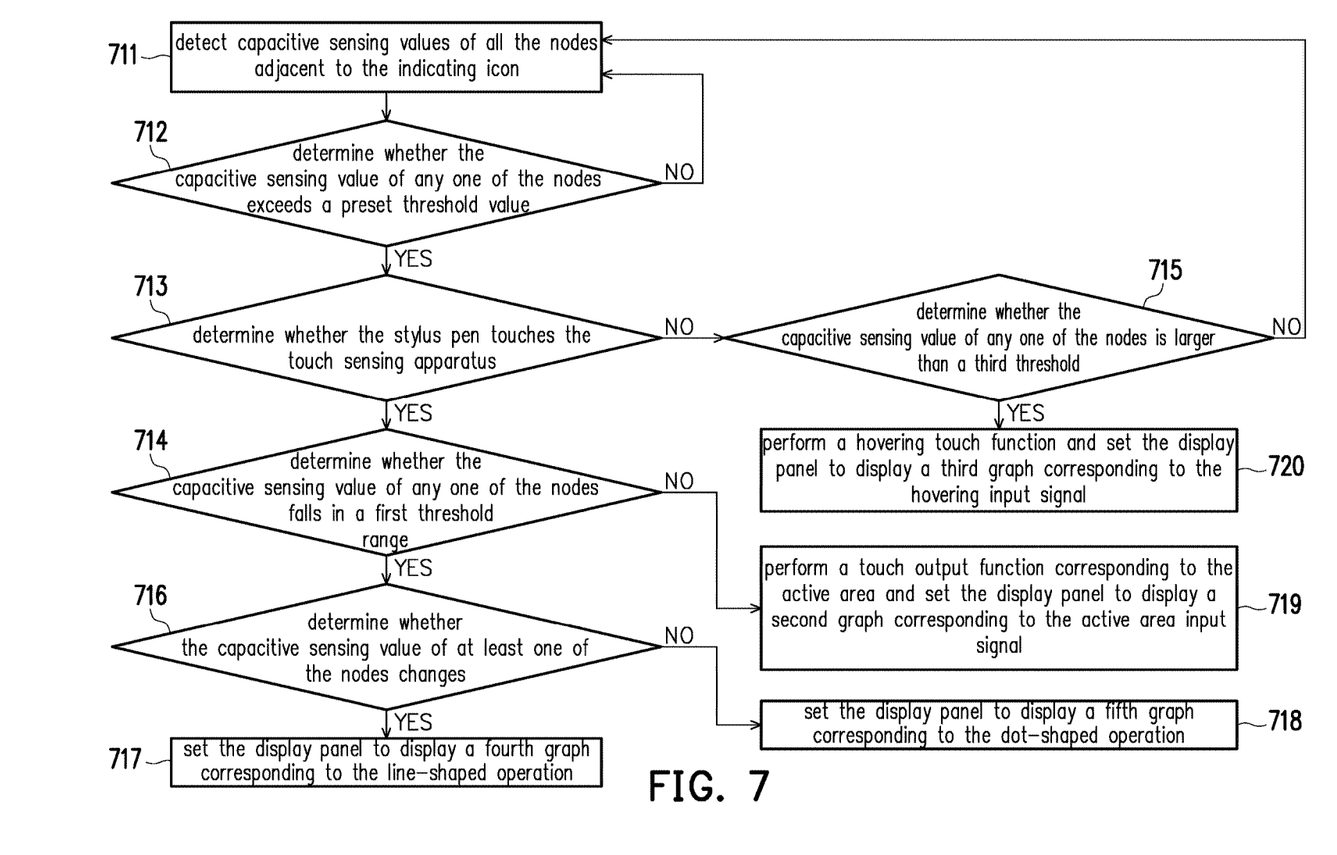

FIG. 6 and FIG. 7 are respectively a schematic top view and a determination flowchart of a touch sensing apparatus according to a second embodiment of the disclosure. With reference to FIG. 6 and FIG. 7, a touch sensing apparatus 200 is similar to the touch sensing apparatus 100 of FIG. 1, wherein the same or similar components are assigned with the same or similar reference numerals, and detailed description thereof is not repeated hereinafter.

A primary difference between the touch sensing apparatus 200 and the touch sensing apparatus 100 is as follows. In the touch sensing apparatus 200, an indicating icon 1131A of a decorative element 113A is in the shape of a line. Besides, the indicating icon 1131A is adjacent to nodes N12, N13 and N14 disposed at the edge of the active area A1. In addition, the touch sensing element 112 of FIG. 7 may be replaced by the touch sensing element 112A as shown in FIG. 3 or the touch sensing element 112B as shown in FIG. 4.

A control circuit 230 of the touch sensing apparatus 200 executes the steps as shown in FIG. 7. With reference to FIG. 6 and FIG. 7, in step 711, capacitive sensing values of the nodes N12, N13 and N14 adjacent to the indicating icon 1131A are detected. For example, capacitive sensing values of all the nodes in FIG. 6 may be simultaneously detected so as to determine the touch sensing states of the active area A1 and the peripheral area A2 at the same time. Alternatively, the capacitive sensing values of the nodes N11, N12 and N14 adjacent to the indicating icon 1131A may be separately detected after or before the capacitive sensing values of all the nodes are detected. That is, the touch sensing states of the active area A1 and the peripheral area A2 may be determined at separate times.

In step 712, it is determined whether the capacitive sensing value of any one of the nodes N12, N13 and N14 exceeds a preset threshold value. If the capacitive sensing value of any one of the nodes N12, N13 and N14 exceeds the threshold value, it means either that a stylus pen 120 touches the touch sensing apparatus 200, or that the stylus pen 120 is close to but does not touch the touch sensing apparatus 200. If it is determined that the capacitive sensing value of at least one of the nodes N12, N13 and N14 exceeds the threshold value, it proceeds to determine whether the stylus pen 120 touches the touch sensing apparatus 200 (step 713). If none of the capacitive sensing values of the nodes N12, N13 and N14 exceeds the threshold value, it means that the stylus pen 120 is not in the touch operation range of the touch sensing apparatus 200, so the determination process returns to step 711.

When the control circuit 230 determines that the capacitive sensing value of at least one of the nodes N12, N13 and N14 exceeds the threshold value, it proceeds to determine whether the stylus pen 120 touches the touch sensing apparatus 200 (step 713).

For example, the tip of the stylus pen 120 may be provided with a pressure sensing circuit. When the tip of the stylus pen 120 touches the touch sensing apparatus 200, the stylus pen 120 transmits a tip-on signal to the control circuit 230, so that the control circuit 230 may determine that the stylus pen 120 touches the touch sensing apparatus 200.

When the stylus pen 120 touches the touch sensing apparatus 200, the stylus pen 120 may touch the active area A1, or may touch the indicating icon 1131A of the peripheral area A2. Therefore, if the control circuit 230 determines that the stylus pen 120 touches the touch sensing apparatus 200, it proceeds to determine whether the capacitive sensing value of any one of the nodes N12, N13 and N14 falls in the first threshold range (step 714), and the minimum value of the first threshold range is set to be larger than the threshold value. If the capacitive sensing value of any one of the nodes N12, N13 and N14 falls in the first threshold range, it means that the stylus pen 120 touches the indicating icon 1131A of the peripheral area A2. Therefore, if it is determined that the capacitive sensing value of at least one of the nodes N12, N13 and N14 falls in the first threshold range, the control circuit 230 determines that the input signal of the stylus pen 120 is an input signal corresponding to the peripheral area A2 (i.e., a peripheral area input signal), and the control circuit 230 sets the display panel 140 (see FIG. 2) to display a graph corresponding to the indicating icon operation of the indicating icon 1131A. In this embodiment, the indicating icon operation of the indicating icon 1131A includes a line-shaped operation and a dot-shaped operation. Therefore, to confirm whether to perform the line-shaped operation or the dot-shaped operation, it is determined whether the capacitive sensing value of at least one of the nodes N12, N13 and N14 changes (step 716). If the capacitive sensing value of at least one of the nodes N12, N13 and N14 changes, it means that the stylus pen 120 changes its location instead of staying in the same place. Therefore, if the capacitive sensing value of at least one of the nodes N12, N13 and N14 changes, the control circuit 230 sets the display panel 140 (see FIG. 2) to display a fourth graph corresponding to the line-shaped operation (step 717). If none of the capacitive sensing values of the nodes N12, N13 and N14 changes, it means that the stylus pen 120 stays in the same location. Therefore, if it is determined that none of the capacitive sensing values of the nodes N12, N13 and N14 changes, the control circuit 230 sets the display panel 140 (see FIG. 2) to display a fifth graph corresponding to the dot-shaped operation (step 718). The dot-shaped operation is as described in the previous paragraphs, and detailed description thereof is not repeated hereinafter. The line-shaped operation may be slide selection, such as selecting a pen type by sliding, selecting a font size by sliding, or selecting a font color by sliding, but is not limited thereto.

On the other hand, when none of the capacitive sensing values of the nodes N12, N13 and N14 falls in the first threshold range (e.g., each of the capacitive sensing values of the nodes N12, N13 and N14 is larger than a second threshold, and the second threshold is larger than or equal to the maximum value of the first threshold range), it means that the stylus pen 120 touches the active area A1. Therefore, the control circuit 230 determines that the input signal of the stylus pen 120 is an input signal corresponding to the active area A1 (i.e., an active area input signal). The control circuit 230 performs a touch output operation corresponding to the active area A1 and sets the display panel 140 (see FIG. 2) to display a second graph corresponding to the active area input signal (step 719). For example, the display panel 140 is set to display an effect of performing a click operation in the corresponding display area or perform an ink output operation in a drawing program. When the ink output operation is performed, the color of the location in a viewable area A4 (see FIG. 2) corresponding to the stylus pen 120 is changed accordingly.

When the control circuit 230 does not receive the tip-on signal, it means that the stylus pen 120 does not touch the touch sensing apparatus 200, and the stylus pen 120 may be in a hover touch range of the touch sensing apparatus 200 or may be outside the hover touch range of the touch sensing apparatus 200. Therefore, in step 715, the control circuit 230 determines whether the capacitive sensing value of any one of the nodes N12, N13 and N14 is larger than a third threshold. If the capacitive sensing value of at least one of the nodes N12, N13 and N14 is larger than the third threshold, it means that the stylus pen 120 is in the hover touch range of the touch sensing apparatus 200. Therefore, if it is determined that the capacitive sensing value of at least one of the nodes N12, N13 and N14 exceeds the third threshold, and the control circuit 230 determines that the input signal of the stylus pen 120 is a hover input signal, the control circuit 230 performs a hover touch function to set the display panel 140 to display a third graph corresponding to the hover input signal (step 720). For example, the display panel 140 is set to display an effect of moving a cursor in the corresponding display area. On the contrary, if none of the capacitive sensing values of the nodes N12, N13 and N14 is larger than the third threshold, it means that the stylus pen 120 is outside the hover touch range of the touch sensing apparatus 200. Therefore, if it is determined that none of the capacitive sensing values of the nodes N12, N13 and N14 is larger than the third threshold, the determination process then returns to step 711.

While the number of the indicating icon is one in both the first embodiment and the second embodiment, the disclosure is not limited thereto. In another embodiment, the number of the indicating icon may be more than one. For example, the touch sensing apparatus may have a plurality of dot-shaped indicating icons, a plurality of line-shaped indicating icons, or a combination of at least one dot-shaped indicating icon and at least one line-shaped indicating icon. Besides, when the touch sensing apparatus has a plurality of indicating icons, the plurality of indicating icons may be located on the same side, two adjacent sides, two opposite sides, three sides or four sides of the touch sensing element. In another embodiment, the touch sensing apparatus may not be provided with any indicating icon.

In summary, in the touch sensing apparatus of the embodiments of this disclosure, the at least one node disposed at the edge of the active area is further used for touch sensing in the peripheral area in addition to the touch sensing in the active area.

Therefore, the touch sensing apparatus of the embodiments of the disclosure may provide the stylus pen with the touch sensing function in the active area as well as in the peripheral area, and it is not necessary to additionally provide any electrodes for touch sensing in the peripheral area.

Although the embodiments are already disclosed as above, these embodiments should not be construed as limitations on the scope of the disclosure. It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch sensing apparatus, configured to receive an input signal of a stylus pen, comprising:
   a display panel;
   a touch panel, bonded to the display panel and comprising a substrate, a touch sensing element and a decorative element, wherein the touch sensing element is located on the substrate and comprises a plurality of nodes for detecting the input signal of the stylus pen, the plurality of nodes are disposed in an active area of the substrate and are not disposed in a peripheral area of the substrate, and the decorative element covers at least a portion of the peripheral area and exposes at least a portion of the active area; and a control circuit, coupled to the display panel and the touch panel, wherein when the control circuit receives a tip-on signal representing that the stylus pen touches the touch sensing apparatus, and a first capacitive sensing value of a first node at an edge of the active area falls in a first threshold range, the control circuit determines that the input signal of the stylus pen is a peripheral area input signal, and sets the display panel to display a first graph corresponding to the peripheral area input signal;

when the control circuit receives the tip-on signal representing that the stylus pen touches the touch sensing apparatus, and a second capacitive sensing value of the first node at the edge of the active area is larger than a second threshold that is larger than or equal to a maximum value of the first threshold range, the control circuit determines that the input signal of the stylus pen is an active area input signal, and sets the display panel to display a second graph corresponding to the active area input signal; and when the control circuit does not receive the tip-on signal representing that the stylus pen touches the touch sensing apparatus, and a third capacitive sensing value of the first node at the edge of the active area is larger than a third threshold, the control circuit determines that the input signal of the stylus pen is a hover input signal, and sets the display panel to display a third graph corresponding to the hover input signal.

2. The touch sensing apparatus as recited in claim 1, wherein the decorative element further comprises a non-conductive indicating icon located in the peripheral area, and the non-conductive indicating icon is adjacent to the first node at the edge of the active area.

3. The touch sensing apparatus as recited in claim 2, wherein the non-conductive indicating icon is adjacent to a plurality of second nodes disposed at the edge of the active area and representing a line-shaped operation; and when the control circuit receives the tip-on signal representing that the stylus pen touches the touch sensing apparatus, a plurality of fourth capacitive sensing values of the plurality of second nodes at the edge of the active area fall in the first threshold range, and at least one of the fourth capacitive sensing values changes, the control circuit sets the display panel to display a fourth graph corresponding to the line-shaped operation.

4. The touch sensing apparatus as recited in claim 2, wherein the indicating icon is adjacent to a plurality of third nodes disposed at the edge of the active area and representing a dot-shaped operation; and when the control circuit receives the tip-on signal representing that the stylus pen touches the touch sensing apparatus, a plurality of fifth capacitive sensing values of the plurality of third nodes at the edge of the active area fall in the first threshold range, and none of the fifth capacitive sensing values changes, the control circuit sets the display panel to display a fifth graph corresponding to the dot-shaped operation.

5. The touch sensing apparatus as recited in claim 1, wherein the control circuit receives a plurality of sixth capacitive sensing values of all of the plurality of nodes in the touch sensing element, and the control circuit selects a seventh capacitive sensing value of the first node at the edge of the active area from the sixth capacitive sensing values to determine whether the input signal of the stylus pen is the peripheral area input signal, the active area input signal, or the hover input signal.

6. The touch sensing apparatus as recited in claim 1, wherein the control circuit receives an eighth capacitive sensing value of the first node at the edge of the active area before or after receiving a plurality of ninth capacitive sensing values of all of the plurality of nodes in the touch sensing element to determine whether the input signal of the stylus pen is the peripheral area input signal, the active area input signal, or the hover input signal.

* * * * *